(12) United States Patent
Konar et al.

(10) Patent No.: US 12,229,641 B2
(45) Date of Patent: Feb. 18, 2025

(54) METHODS OF TRAINING A GAMMA MIXTURE HURDLE MODEL FOR ESTIMATING CORRESPONDING FOOD FLOWS BETWEEN REGIONS

(71) Applicant: The Board of Trustees of the University of Illinois, Urbana, IL (US)

(72) Inventors: Megan Konar, Champaign, IL (US); Xiaowen Lin, Sunnyvale, CA (US)

(73) Assignee: The Board of Trustees of The University of Illinois, Urbana, IL (US)

( * ) Notice: Subject to any disclaimer, the term of this patent is extended or adjusted under 35 U.S.C. 154(b) by 889 days.

(21) Appl. No.: 17/193,229

(22) Filed: Mar. 5, 2021

(65) Prior Publication Data
US 2021/0279641 A1   Sep. 9, 2021

Related U.S. Application Data

(60) Provisional application No. 62/986,215, filed on Mar. 6, 2020.

(51) Int. Cl.
*G06F 3/048* (2013.01)
*G06N 5/02* (2023.01)
(Continued)

(52) U.S. Cl.
CPC ............ *G06N 20/00* (2019.01); *G06F 3/048* (2013.01); *G06N 5/027* (2013.01); *G06N 7/01* (2023.01); *G06Q 10/06315* (2013.01)

(58) Field of Classification Search
None
See application file for complete search history.

(56) References Cited

U.S. PATENT DOCUMENTS

2019/0188616 A1\* 6/2019 Urban ................ G06Q 10/0875
2020/0342465 A1   10/2020 Ruddell et al.
2021/0065031 A1\* 3/2021 Parikh .................... G06Q 50/60

OTHER PUBLICATIONS

Konar et al. (Konar) Scaling properties of food flow networks, Jul. 10, 2018, PLOSlone https://doi.org/10.1371/journal.pone.0199498 (Year: 2018).\*

(Continued)

*Primary Examiner* — Xuyang Xia
(74) *Attorney, Agent, or Firm* — McDonnell Boehnen Hulbert & Berghoff LLP

(57) ABSTRACT

Embodiments described herein relate to training, by a computing system, a gamma mixture hurdle model. The model may characterize a functional relationship between: output data specifying food flows between zones, and input variables representing food production and food consumption in the zones. The training involves: (i) using binary logistic regression to estimate whether corresponding food flows exist between zone pairs, and (ii) for pairs in which corresponding food flows exist, using a gamma mixture model to estimate amounts of the corresponding food flows. Based on the gamma mixture hurdle model, the computing system can estimate, where each zone includes a respective set of regions: (i) whether corresponding food sub-flows exist between region pairs, and (ii) for pairs in which the corresponding food sub-flows are estimated to exist, potentials of the corresponding food sub-flows. The computing system can also determine, using a linear programming framework, values for the corresponding food sub-flows.

20 Claims, 8 Drawing Sheets

(51) Int. Cl.
  *G06N 7/01* (2023.01)
  *G06N 20/00* (2019.01)
  *G06Q 10/0631* (2023.01)

(56) References Cited

OTHER PUBLICATIONS

Zhou et al. (Zhou) "A linear threshold-hurdle model for product adoption prediction incorporating social network effects" Information Sciences vol. 307, Jun. 20, 2015, pp. 95-109, https://doi.org/10.1016/j.ins.2015.02.027 (Year: 2015).*
Cassa, "Spatial outbreak detection analysis tool : a system to create sets of semi-synthetic geo-spatial clusters" 2004, URI http://hdl.handle.net/1721.1/33124, Department Massachusetts Institute of Technology. Department of Electrical Engineering and Computer Science (Year: 2004).*
Lancichinetti et cl. (Lancichinett) "Finding Statistically Significant Communities in Networks", Published: Apr. 29, 2011, https://doi.org/10.1371/journal.pone.0018961 (Year: 2011).*
Ghosn et al. (Ghosn) "Performance Indicators for Structural Systems and Infrastructure Networks" Jun. 2, 2016, Publication: Journal of Structural Engineering, vol. 142, Issue 9, https://doi.org/10.1061/(ASCE)ST.1943-541X.000154 (Year: 2016).*
Lin et al. "A Network Analysis of Food Flows within the United States of America" Publication Date:Apr. 28, 2014 https://doi.org/10.1021/es500471d (Year: 2014).*
P.J. Boland, Statistical and Probabilistic Methods in Actuarial Science (New York: Chapman and Hall) (https://doi.org/10.1201/9781584886969), 2007.
Oak Ridge National Laboratory, County-to-county Distance Matrix (http://cta.ornl.gov/transnet/SkimTree.htm), 2011.
S. Venkatramanan et al., Towards robust models of food flows and their role in invasive species spread, 2017 IEEE Int. Conf. on Big Data (BIGDATA), (https://doi.org/10.1109/BigDATA.2017.8257955), 2017.
N. Balakrishnan, et al., The exponential distribution: Theory, methods and applications, SIAM Review, 40 (1), 167-168, 1998.
M.T. Thai, et al., Handbook of optimization in complex networks, 544 pp., Springer, 2012.
J. Tinbergen, An Analysis of World Trade Flows, in: Shaping the world economy, Twentieth Century Fund, 1962.
S. Han, et al., US trade overview, 2013, Department of Commerce, International Trade Administration, Oct. 2014.
J.A. Hanley, et al., The meaning and use of the area under a receiver operating characteristic (roc) curve1, Radiology, 143 (1), 29-36, Apr. 1982.
M.C. Hansen, et al., Quantification of global gross forest cover loss, PNAS, 107 (19), 8650-8655, doi: 10.1073/pnas.0912668107, Mar. 17, 2010.
T. Hertel, et al., The poverty implications of climate-induced crop yield changes by 2030, Global Environmental Change, 20 (4), 577-585, Jul. 5, 2010.
A.Y. Hoekstra, et al., The water footprint of humanity, Proceedings of the national academy of sciences, 109 (9), 3232-3237, Feb. 28, 2012.
P.W. Holland, et al., Robust regression using iteratively reweighted least-squares, Communications in Statistics-theory and Methods, 6 (9), 813-827, 1977.
E. Holt-Gimenez, et al. We already grow enough food for 10 billion people and still can't end hunger, 2012.
E.M. Hoover, Interstate redistribution of population, 1850-1940, J. Econ. Hist., 1, 199-205, 1941.
M. Jackson, Social and economic networks, Princeton University Press, 2008.
M.O. Jackson, et al., The existence of pairwise stable networks, 2001.
M.O. Jackson, et al., Social capital and social quilts: Network patterns of favor exchange, American Economic Review, 102 (5), 1857-97, Aug. 2012.
H. Jeong, et al., Measuring preferential attachment in evolving networks, EPL (Europhysics Letters), 61 (4), 567, Feb. 15, 2003.
V. Kalapala, et al., Scale invariance in road networks, Phys. Rev. E, 73 (2), 2006.
P. Kaluza, et al., The complex network of global cargo ship movements, Journal of the Royal Society Interface, 7, 1093-1103, doi: 10.1098/rsif.2009.0495, Jan. 19, 2010.
T. Kastner, et al., Global changes in diets and the consequences for land requirements for food, Proc. Nat. Acad. Sci., 109 (18), 6868-6872, doi:10.1073/pnas. 1117054109, May 1, 2012.
R. Kohavi, et al., A study of cross-validation and bootstrap for accuracy estimation and model selection, in ljcai, vol. 14, pp. 1137-1145, Montreal, Canada, 1995.
M. Konar, et al., Virtual water trade and development in Africa, Hydrol. Earth Syst. Sci., 17, 3969-3982, doi:10.5194/ness-17-3969-2013, Jun. 6, 2013.
M. Konar, et al., Water for food: The global virtual water trade network, Water Resources Research, 47 (W05520), doi:10.1029/2010WR010307, 2011.
M. Konar, et al., Temporal dynamics of blue and green virtual water trade networks, Water Resources Research, 48 (W07509), doi:10.1029/2012WR011959, Jul. 12, 2012.
M. Konar, et al., Water resources sustainability in a globalizing world: who uses the water?, Hydrological Processes, 30 (18), 3330-3336, Apr. 19, 2016.
M. Konar, et al., The water footprint of staple crop trade under climate and policy scenarios, Environmental Research Letters, 11 (3), 035,006, Feb. 26, 2016.
F. Kyriakopoulos, et al., Network and eigenvalue analysis of financial transaction networks, The European Physical Journal B, 71, 523-531, Jul. 21, 2009.
V. Leroy, et al., Cold start link prediction, in Proceedings of the 16th ACM SIGKDD international conference on Knowledge discovery and data mining, pp. 393-402, ACM, 2010.
S.A. Levin, The problem of pattern and scale in ecology: the robert h. macarthur award lecture, Ecology, 73 (6), 1943-1967, Dec. 1992.
J. Liu, et al., Framing sustainability in a telecoupled world, Ecology and Society, 18 (2), Jun. 2013.
L. Lu, et al., Link prediction in complex networks: A survey, Physica A: statistical mechanics and its applications, 390 (6), 1150-1170, 2011.
G.K. MacDonald, et al., Embodied phosphorus and the global connections of united states agriculture, Environmental Research Letters, 7 (4), 044,024, Nov. 5, 2012.
L. Marston, et al., Drought impacts to water footprints and virtual water transfers of the central valley of california, Water Resources Research, 53 (7), 5756-5773, Jul. 18, 2017.
L. Marston, et al., Virtual groundwater transfers from overexploited aquifers in the united states, Proceedings of the National Academy of Sciences, 112 (28), 8561-8566, Jul. 14, 2015.
D. Mas, et al., Networks and syndication strategies: Does a venture capitalist need to be in the center?, ERMES-CNRS Universite Pantheon Assas Paris II, Working Paper No. 07-14, 2007.
A. Masucci, et al., Random planar graphs and the london street network, UCL Working Paper Series, 146, Aug. 18, 2009.
R. May, et al., Ecology for bankers, Nature, 451 (21), 893-895, Feb. 2008.
P.P. Micklin, Desiccation of the aral sea: a water management disaster in the soviet union, Science, 241 (4870), 1170-1176, Sep. 2, 1988.
R. Milo, et al., Superfamilies of evolved and designed networks, Science, 303 (5663), 1538-1542, doi: 10.1126/science.1089167, Mar. 5, 2004.
M.D. Morris, et al., Factorial sampling plans for preliminary computational experiments, Technometrics, 33 (2), 161-174, May 1991.
A.E. Motter, et al., Cascade-based attacks on complex networks, Physical Review E, 66, 065, 102, doi: 10.1103/PhysRevE.66.065102, Dec. 20, 2002.
M. Newman, Scientific collaboration networks: 1. Network construction and fundamental results, Physical Review E, 64, 016,131, Jun. 28, 2001.
M. Newman, Assortative mixing in networks, Phys. Rev. Lett., 89, 208,701, Nov. 11, 2002.

(56) References Cited

OTHER PUBLICATIONS

J.I.L. Miguens, et al., "Weighted and Directed Network on Traveling Patterns," P. Lio et al. (Eds.): BIOWIRE 2007, LNCS 5151, pp. 145-154, 2008.
C. Gini, Concentration and dependency ratios (in italian), english translation in, Rivista di Politica Economica, 87, 769-789, 1909, (including machine translation of section 1 (abstract/introduction).
S. Wasserman, et al., "Social network analysis: Methods and applications," 1st ed., Cambridge University Press, 1994.
F. Ramsey, et al., "The statistical sleuth: a course in methods of data analysis," Cengage Learning, 2012.
M. Convertino, et al., Untangling drivers of species distributions:global sensitivity and uncertainty analyses of MaxEnt, Environ. Modelling & Software, 51 296-309, 2014.
D.R. Cox, The regression analysis of binary sequences, J. R. Stat. Soc., B 20 215-42, 1958.
A.D. Cuellar, et al., Wasted food, wasted energy: the embedded energy in food waste in the United States, Environ. Sci. Technol., 44 6464-9, Jul. 2, 2010.
R.I. Cukier, et al., A. study of the sensitivity of coupled reaction systems to uncertainties in rate coefficients. I theory, J. Chem. Phys., 59 3873-8, Jan. 18, 1973.
C. Dalin, et al., Environmental impacts of food trade via resource use and greenhouse gas emissions, Environ. Res. Lett., 11 035012, Mar. 4, 2016.
Q. Dang, et al., Agricultural virtual water flows within the United States, Water Resour. Res., 51 973-86, Feb. 19, 2015.
T. Deryugina, et al., Impacts of crop insurance on water withdrawals for irrigation, Adv. Water Res., 110 437-44, Mar. 18, 2017.
A.C. Disdier, et al., The puzzling persistence of the distance effect on bilateral trade, Rev. Econ. Stat., 90 37-48, Feb. 2008.
Fao, Staple foods: what do people eat? (http://fao.org/docrep/u8480e/U8480E07.htm#Staple%20foods%20What%20do%20people%20eat), 2013.
J.C. Gower, A general coefficient of similarity and some of its properties, Biometrics, 27 857-71, Dec. 1971.
T. Homma, et al., Importance measures in global sensitivity analysis of nonlinear models, Reliab. Eng. Syst. Saf., 52 1-17, Jan. 5, 1996.
A.M. Isserman, et al., 1.5 million missing Nos. overcoming employment suppression in county business patterns data, Int. Reg. Sci. Rev. (https://doi.org/10.1177/0160017606290359), Jul. 2006.
M. Klein, A primal method for minimal cost flows with applications to the assignment and transportation problems, Manage. Sci., 14 205-20, Nov. 1967.
X. Lin, et al., A network analysis of food flows within the United States of America, Environ. Sci. Technol., 48 5439-47, 2014.
N. Ludtke, et al., Information-theoretic sensitivity analysis: a general method for credit assignment in complex networks, J. R. Soc. Interface, 5 223-35, Jun. 26, 2007.
G.K. Macdonald, et al., Rethinking agricultural trade relationships in an era of globalization, BioScience, 65 275-89, Mar. 2015.
M. Mohri et al., Foundations of Machine Learning (Cambridge, MA: MIT Press), 2012.
A. Saltelli, et al., Global Sensitivity Analysis: The Primer (Chichester: Wiley), 2008.
D. Seekell, et al., Resilience in the global food system, Environ. Res. Lett., Feb. 9, 2017.
J.L. Servadio, et al., Optimal information networks: application for data-driven integrated health in populations, Sci. Adv., Feb. 2, 2018.
US Census Bureau 2015b, 2012 Commodity Flow Survey Public Use Microdata (https://census.gov/econ/cfs/pums.html).
N. Vora et al., Food-energy-water nexus: quantifying embodied energy and ghg emissions from irrigation through virtual water transfers in food trade, ACS Sustain. Chem. Eng., 5 2119-28, Jan. 16, 2017.
S. Walker, et al., Estimation of the probability of an event as a function of several independent variables, Biometrika, 54 167-78, 1967.
G. Wang, et al., A comparative assessment of ensemble learning for credit scoring, Expert Syst. Appl., 38 223-30, 2011.
Xiaowen Lin, Understanding and Modeling Food Flow Networks Across Spatial Scales, Dissertation submitted in Graduate College of the University of Illinois at Urbana-Champaign, 2019, pp. 118.
Xiaowen LIN, et al., Food flows between counties in the United States, Environmental Research Letters, Jul. 26, 2019, 18 pgs., IOP Publishing.
R.K. Ahuja, et al., Network Flows: Theory, Algorithms, and Applications (London: Pearson), 1993.
M. Ercsey-Ravasz, et al., Complexity of the international agro-food trade network and its impact on food safety, PLoS One, 7 e37,810, 2012.
M. Konar, et al., Scaling properties of food flow networks, PLoS One, 13 e0199498, 2018.
S. Liang, et al., Socioeconomic drivers of greenhouse gas emissions in the united states, Environ. Sci. Technol., 50 7535-45, 2016.
X-Z Liang, et al., Determining climate effects on US total agricultural productivity, Proc. Natl Acad. Sci., 114 E2285- 92, 2017.
G.R. Llorden, Gamma Mixture Model Estimation withEM Algorithm MathWorks File Exchange (https://www.mathworks.com/matlabcentral/fileexchange/53028-gamma-mixture-model-estimation-with-em-algorithm), 2017.
D.B. Lobell, et al., Climate trends and global crop production since 1980, Science, 333 616-20, 2011.
S.P. Long, et al., Meeting the global food demand of the future by engineering crop photosynthesis and yield potential, Cell, 161 56-66, 2015.
L. Marston, et al., High-resolution water footprints of production of the United States, Water Resour. Res., 54 2288-316, 2018.
M. Nesheim, et al., A Framework for Assessing Effects of the Food System (Washington, DC:National Academies Press), 2015.
M. Porkka et al., From food insufficiency towards trade dependency: a historical analysis of global food availability, PLoS One, 714, 2013.
R.R. Rushforth et al., Aspatially detailed and economically complete blue water footprint of the United States, Hydrol. Earth Syst. Sci. (https://doi.org/10.5194/hess-22-3007-2018), 2018.
A. Saltelli, et al., A quantitative modelindependent method for global sensitivity analysis of model output, Technometrics, 41 39-56, 1999.
T.M. Smith, et al., Subnational mobility and consumption-based environmental accounting of US corn in animal protein and ethanol supply chains, Proc. Natl Acad. Soc., 11 E7891-9, 2017.
US Bureau of Economic Analysis, Input-Output Accounts Data (https://bea.gov/industry/io_annual.htm), 2014.
US Census Bureau 2015a, 2012 Economic Census (http://census.gov/data.html).
US Census Bureau, US Census Bureau USA Trade Database (https://usatrade.census.gov/index.php), 2018.
US Department of Agriculture, National Agricultural Statistics Service Quick Stats (http://quickstats.nass.usda.gov), 2014.
USDA, United States Department of Agriculture Economic, Research Service (http://ers.usda.gov/data-products.aspx), 2013.
C.L. Weber, et al., Food-miles and the relative climate impacts of food choices in the United States, Environ. Sci. Technol., 42 3508-13, 2008.
M. Xu, et al., Interconnectedness and resilience of the US economy, Adv. Complex Syst., 14 649-72, 2011.
M.M. Aldaya, et al., The water footprint assessment manual: Setting the global standard, Routledge, 2012.
E. Artin, The gamma function, Courier Dover Publications, 2015.
M.O. Jackson, Social and economic networks, Princeton university press, 2010.
Oak Ridge National Laboratory, Freight Analysis Framework, version 4 (http://faf.ornl.gov/fafweb/), 2015.
US Bureau of Economic Analysis, Local Area Personal Income and Employment (https://bea.gov/iTable/itable.cfm?reqid=70&step=1&isuri=1&acrdn=7#reqid=70&step=1&isuri=1), 2017.
CFS (2013), Commodity Flow Survey, http://www.census.gov/econ/cfs/.
Feed America (2018b), Hunger a harsh reality for 14 million children nationwide.
SCTG (2017), 2012 commodity flow survey standard classification of transported goods (sctg).

(56) References Cited

OTHER PUBLICATIONS

M. Newman, Coauthorship networks and patterns of scientific collaborations, Proc. Nat. Acad. Sci., 101, 5200-5205, Apr. 6, 2004.
M. Newman, et al., The structure and dynamics of networks, 1st ed., Princeton University Press, 2006.
M.E. Newman, Clustering and preferential attachment in growing networks, Physical review E, 64 (2), 025, 102, Jul. 26, 2001.
P.A. Nolin, Food-sharing networks in lamalera, indonesia, Human Nature, 21 (3), 243-268, Aug. 27, 2010.
C. O'Bannon, et al., Globalization of agricultural pollution due to international trade, Hydrol. Earth Syst. Sci. Discuss., 10, 11,221-11,239, doi:10.5194/hessd-10-11221-2013, Aug. 27, 2013.
D.M. Pennock, et al., Winners don't take all: Characterizing the competition for links on the web, Proc. Nat. Acad. Sci., 99 (8), 5207-5211, Apr. 16, 2002.
G. Peters, et al., Growth in emission transfers via international trade from 1990 to 2008, Proc. Nat. Acad. Sci., 108 (21), 8903-8908, doi: 10.1073/pnas.1006388108, May 24, 2011.
M.J. Puma, et al., Assessing the evolving fragility of the global food system, Environmental Research Letters, 10 (2), 024,007, Feb. 4, 2015.
Python (2018), python, http://geocoder.readthedocs.io.
J.J. Reimer, et al., Trade costs and the gains from trade in crop agriculture, American Journal of Agricultural Economics, 92 (4), 1024-1039, Jun. 10, 2010.
S.M. Rinaldi, et al., Identifying, understanding, and analyzing critical infrastructure interdependencies, IEEE Control Systems, 21 (6), 11-25, Dec. 2001.
R.R. Rushforth, et al., The vulnerability and resilience of a city's water footprint: The case of flagstaff, arizona, USA, Water Resources Research, 52 (4), 2698-2714, Apr. 8, 2016.
R.R. Rushforth, et al., A Spatially Detailed and Economically Complete Blue Water Footprint of the United States, Hydrology and Earth System Sciences, doi:10.5194/hess-2017-650, 2018.
G.D. Ruxton, The unequal variance t-test is an underused alternative to student's t-test and the mann-whitney u test, Behavioral Ecology, 17 (4), 688-690, May 17, 2006.
K. Ryu, An extension of marshall and olkin's bivariate exponential distribution, Journal of the American Statistical Association, 88 (424), 1458-1465, Dec. 1993.
F. Salako, et al., Soil water depletion under various leguminous cover crops in the derived savanna of west africa, Agriculture, Ecosystems & Environment, 100 (2-3), 173-180, 2003.
U.S. Sayles, et al., Social ecological network analysis of scale mismatches in estuary watershed restoration, Proceedings of the National Academy of Sciences, 114 (10), E1776-E1785, Feb. 21, 2017.
M. Schipanski, et al., The influence of agricultural trade and livestock production on the global phosphorus cycle, Ecosystems, 15 (2), 256-268, doi:10.1007/s10021-011-9507-x, Mar. 2012.
D. Seekell, et al., Virtual water transfers unlikely to redress inequality in global water use, Environ. Res. Lett., 6 (024017), Jun. 7, 2011.
M. Serrano, et al., Topology of the world trade web, Phys. Rev. E, 68 (1), 015, 101, Jul. 11, 2003.
K.C. Seto, et al., Urban land teleconnections and sustainability, Proceedings of the National Academy of Sciences, 109 (20), 7687-7692, May 15, 2012.
Q. Shen, et al., Virtual water scarcity risk to the global trade system, Environmental Science & Technology, 52 (2), 673-683, doi:10.1021/acs.est.7b04309, 2018.
S.T. Shutters, et al., Agricultural trade networks and patterns of economic development, PLoS One, 7 (7), 39,756, doi:10.1371/journal.pone.0039756, Jul. 2012.
I.M. Sobol, Global sensitivity indices for nonlinear mathematical models and their monte carlo estimates, Mathematics and computers in simulation, 55 (1-3), 271-280, 2001.
R. Tibshirani, Regression shrinkage and selection via the lasso, Journal of the Royal Statistical Society: Series B (Methodological), 58 (1), 267-288, 1996.

D. Tilman, Global environmental impacts of agricultural expansion: The need for sustainable and efficient practices, PNAS, 96 (11), 5995-6000, doi: 10.1073/pnas.96.11.5995, May 1999.
P. Vitousek, et al., Human domination of Earth's ecosystems, Science, 277 (5325), 494-499, Jul. 25, 1997.
D. Watts, Small worlds: the dynamics of networks between order and randomness, 1st ed., Princeton University Press, 1999.
D.J. Watts, et al., Collective dynamics of small-world networks, Nature, 393 (6684), 440-442, Jun. 4, 1998.
G.B. West, et al., A general model for the origin of allometric scaling laws in biology, Science, 276 (5309), 122-126, Apr. 4, 1997.
F. Wu, et al., Global maize trade and food security: Implications from a social network model, Risk Analysis, 33 (12), doi:10.1111/risa.12064, May 2013.
M. Xu, et al., Developing a science of infrastructure ecology for sustainable urban systems, Jul. 9, 2012.
M. Konar, A national strategy for a resilient food supply chain, 2019.
R. Wang, et al., Freshwater vulnerability beyond local water stress:heterogeneous effects of water-electricity nexus across the continental United States, Environ. Sci. Technol., 51 9899-910, 2017.
S. Agarwal, et al., A generalized gamma distribution and its application in reliabilty, Communications in Statistics-Theory and Methods, 25 (1), 201-210, 1996.
J.A. Baggio, et al., Multiplex social ecological network analysis reveals how social changes affect community robustness more than resource depletion, Proceedings of the National Academy of Sciences, 113 (48), 13,708-13,713, Nov. 29, 2016.
A.L. Barabasi, Linked: The new science of networks, Perseus Publishing, 2002.
A.L. Barabasi, et al., Emergence of scaling in random networks, Science, 286, 509-512, Oct. 15, 1999.
M. Barigozzi, et al., Multinetwork of international trade: A commodity-specic analysis, Physical Review E, 81, 046, 104, 2010.
A. Barrat, et al., The architecture of complex weighted networks, Proceedings of the National Academy of Sciences, 101 (11), 3747-3752, 2004.
M. Barthelemy, Betweenness centrality in large complex networks, The European Physical Journal B, 38 (2), 163-168, May 14, 2004.
J. Berkoff, China: the south-north water transfer project is it justified?, Water policy, 5 (1), 1-28, Jan. 31, 2003.
M. Bettencourt, et al., Growth, innovation, scaling, and the pace of life in cities, Proceedings of the national academy of sciences, 104 (17), 7301-7306, Apr. 24, 2007.
K. Bhattacharya, et al., The international trade network, Econophysics of markets and business networks, pp. 139-147, 2007.
G. Bloschl, et al., Scale issues in hydrological modelling: a review, Hydrological processes, 9 (3-4), 251-290, 1995.
R.W. Bohannon, Standing balance, lower extremity muscle strength, and walking performance of patients referred for physical therapy, Perceptual and motor skills, 80 (2), 379-385, 1995.
L. Bouwman, et al., Exploring global changes in nitrogen and phosphorus cycles in agriculture induced by livestock production over the 19002050 period, PNAS, 110 (52), 20,882-20,887, doi:10.1073/pnas.1012878108, Dec. 24, 2013.
M. Burger, et al., On the specification of the gravity model of trade: zeros, excess zeros and zero-inflated estimation, Spatial Economic Analysis, 4 (2), 167-190, 2009.
R. Burgess, et al., Can openness mitigate the effects of weather shocks? Evidence from India's famine era, American Economic Review: Papers and Proceedings, pp. 449-453, May 2010.
J. Burton, et al., Community-based health education programs designed to improve clinical measures are unlikely to reduce short-term costs or utilization without additional features targeting these outcomes, Population health management, 20 (2), 93-98, 2017.
C.M. Chini, et al., Direct and indirect urban water footprints of the united states, Water Resources Research, 53 (1), 316-327, Jan. 13, 2017.

(56) References Cited

OTHER PUBLICATIONS

CIA (2017), Central intelligence agency.

COMTRADE (2016), U.n. comtrade database.

L. Costa, et al., Characterization of complex networks: a survey of measurements, Advances in Physics, 56 (1), 167-242, 2007.

C. Dalin, et al., Evolution of the global virtual water trade network, Proc. Nat. Acad. Sci., 109 (16), 5989-5994, doi:10.1073/pnas. 1203176109, Apr. 17, 2012.

C. Damgaard, et al., Describing inequality in plant size or fecundity, Ecology, 81, 1139-1142, Apr. 2000.

P. D'Odorico, et al., Feeding humanity through global food trade, Earth's Future, 2 (9), 458-469, Sep. 10, 2014.

P. Erdos, et al., On the evolution of random graphs, Publ. Math. Inst. Hung. Acad. Sci, 5 (1), 17-60, 1960.

G. Fagiolo, Clustering in complex directed networks, Phys. Rev. E, 76, 026, 107, 2007.

G. Fagiolo, et al., On the topological properties of the world trade web: A weighted network analysis, Physica A, 387, 3868-3873, Jan. 15, 2008.

J.J. Faraway, Extending the linear model with R: generalized linear, mixed effects and nonparametric regression models, Chapman and Hall/CRC, 2006.

Feed America (2018a), Understanding hunger and food insecurity.

J.A. Foley, et al., Global Consequences of Land Use, Science, 309, Jul. 22, 2005.

W.A. Foundation, Hunger statistics, 2018.

D. Fricke, et al., On assortative and disassortative mixing scale-free networks: The case of interbank credit network, Kiel Working Paper No. 1830, Feb. 2013.

D. Garlaschelli, et al., Structure and evolution of the world trade network, Physica A, 355, 491-499, May 4, 2005.

H.C.J. Godfray, et al., Food security: The challenge of feeding 9 billion people, Science, 327 (5967), 812-818, doi:10.1126/science. 1185383, Feb. 12, 2010.

R. Guimera, et al., The real communication network behind the formal chart: Community structure in organizations, Journal of Economic Behavior and Organization, 61, 653-667, Jul. 7, 2006.

R.D. Gupta, et al., Theory & methods: Generalized exponential distributions, Australian & New Zealand Journal of Statistics, 41 (2), 173-188, 1999.

\* cited by examiner

| Variable | Description |
|---|---|
| T | Food flows in mass [kg] for all county pairs |
| A | Adjacency matrix of connectivity for all county pairs |
| D | Distance between all counties |
| GDP | Gross Domestic Product [$] |
| POP | Population |
| P | Production [tons] |
| IND | Sum of industrial products utilizing a particular SCTG as input |
| LIVE | Production of all livestock |
| A1 | Animal slaughtering and processing |
| A2 | All other food manufacturing |
| A3 | All other miscellaneous chemical product and preparation manufacturing |
| B1 | Bakeries and tortilla manufacturing |
| C1 | Cattle |
| C2 | Chickens |
| C3 | Coffee and tea manufacturing |
| D1 | Dairy product (except dried or canned) merchant wholesalers |
| D2 | Dry, condensed, and evaporated dairy product manufacturing |
| F1 | Fruit and vegetable canning, pickling, and drying |
| F2 | Food and beverage stores |
| F3 | Fresh fruit and vegetable merchant wholesalers |
| F4 | Frozen food manufacturing |
| F5 | Fats and oils refining and blending |
| G1 | Goats |
| G2 | General merchandise stores |
| G3 | Gasoline stations |
| G4 | Grain and field bean merchant wholesalers |
| G5 | Grain and oilseed milling |
| H1 | Hogs |
| I1 | Ice cream and frozen dessert manufacturing |
| M1 | Meat and meat product merchant wholesalers |
| M2 | Meat processed from carcasses |
| O1 | Other animal food manufacturing |
| O2 | Other food manufacturing |
| P1 | Poultry processing |
| R1 | Rendering and meat by product processing |
| R2 | Poultry and poultry product merchant wholesalers |
| S1 | Seafood product preparation and packaging |
| S2 | Sugar and confectionery product manufacturing |
| S3 | Snack food manufacturing |
| S4 | Soft drink and ice manufacturing |
| S5 | Sheep |
| S6 | Seasoning and dressing manufacturing |
| S7 | Support activities for transportation |
| T1 | Turkeys |
| W1 | Wholesale trade |

FIG. 5

METHODS OF TRAINING A GAMMA MIXTURE HURDLE MODEL FOR ESTIMATING CORRESPONDING FOOD FLOWS BETWEEN REGIONS

CROSS-REFERENCE TO RELATED APPLICATION

This application claims priority to U.S. provisional patent application No. 62/986,215, filed Mar. 6, 2020, which is hereby incorporated by reference in its entirety.

GOVERNMENT LICENSE RIGHTS

This invention was made with government support under Grant Nos. ACI 1639529 and CBET-1844773, both awarded by the National Science Foundation. The government has certain rights in the invention.

BACKGROUND

Information dealing with commodity movements from a first geographic zone to a second geographic zone is available in various contexts. Most research in supply chain flows focus on increasing production for an industry and focuses on broad geographic regions. It is often overlooked that distribution through complex supply chains is also relevant to product distribution. Supply chains are increasingly complex and global in scope, incorporating the production, distribution, and consumption of foods. However, processing supply chain data is exceedingly cumbersome and inefficient.

Currently data related to supply chains is processed at a coarse scale to gather broad data for shipping zones. Even at the coarse scale, the data amounts are massive. Currently, training a machine learning model based on the amount of supply chain data is inefficient. Moreover, there is a lack of ways to determine a supply chain network between specific geographic locations based on food flows at a detailed level.

SUMMARY

The embodiments herein present a technique for training, by a computing system, a machine learning model to estimate food flows between regions. The technique involves: 1) developing and training a machine learning model with a gamma mixture hurdle model for commodity flow between zones that ship and receive foods, 2) using the gamma mixture hurdle model to simulate food flow potentials between regions, and 3) solving for food flows between the regions using linear programming.

The gamma mixture hurdle is a model in which one process is specified for zeros, and another for ones. Specifically, in the gamma mixture hurdle model, logistic regression is first used to predict whether food is shipped from one zone to another. In other words, logistic regression is used to estimate whether a link exists between the two zones. An output of a 0 indicates that there is no link between the two zones. An output of 1 indicates that there is a link between the two zones. For zones that are linked, a gamma mixture model is used to determine the strength, or amount, of the food flows between the zones. By using a two part hurdle model, the method can focus on relevant data and can be more computationally effective.

The gamma mixture hurdle model may accept variables representing food production and food consumption in the zones. The gamma mixture hurdle model can also follow a gravity model structure, which can include information on income in the zones and the distance between zones. The results of the model may be compared to and trained based on known food flows between zones. Once trained, the model can be used to determine flows between portions of the zones called regions. Particularly, a computing system can use the gamma mixture hurdle model to estimate food flow potentials between regions and then solve the system with linear programing to determine the food flows.

In this manner, vulnerabilities and choke points within a food supply system can be identified to a granular degree. This facilitates the further identification of supply and distribution routes that are critical for the overall system to maintain its integrity, as well as to mitigate avoidable food shortages.

While the techniques herein are focused on food flows, the overall framework may be applied to other commodity flows as well. Thus, these embodiments should not be viewed as limited to food flows.

Accordingly, a first example embodiment may involve training, by a computing system, a gamma mixture hurdle model characterizing a functional relationship between: output data specifying food flows between zones, and input variables representing food production and food consumption in the zones. The training involves: (i) using binary logistic regression to estimate whether corresponding food flows exist between pairs of the zones, and (ii) for pairs of the zones in which the corresponding food flows are estimated to exist, using a gamma mixture model to estimate amounts of the corresponding food flows. Based on parameters of the gamma mixture hurdle model, and where each zone includes a respective set of regions, the computing system can estimate: (i) whether corresponding food sub-flows exist between pairs of the regions, and (ii) for pairs of the regions in which the corresponding food sub-flows are estimated to exist, potentials of the corresponding food sub-flows. The computing system can also determine, using a linear programming framework, values for the corresponding food sub-flows. The linear programming framework can use data specifying food flows as mass balance constraints on totals of the corresponding food sub-flows that are within each of the zones, the potentials as inequality constraints on the corresponding food sub-flows that are within each of the zones, and region-to-region distance data for the regions as a minimization constraint on the corresponding food sub-flows.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5 is a list of model variables, in accordance with example embodiments.

DETAILED DESCRIPTION

Figure 1:
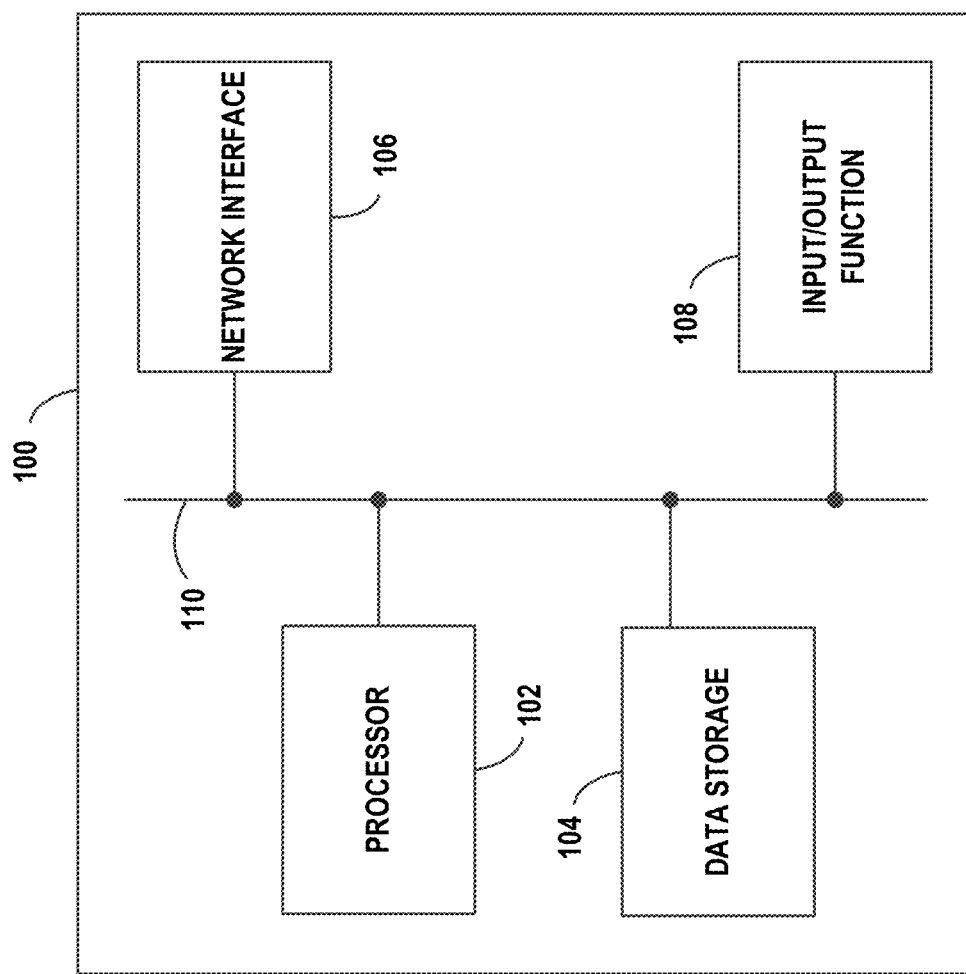
FIG. 1 illustrates a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

The embodiments described herein relate to a technique for training a machine learning model to determine and map food flows between geographic zones to provide greater detail for determining vulnerabilities within a national commodity supply chain, critical infrastructures, and enabling spatially detailed footprint assessments. Food flows are the movement of food products between geographic zones. In some examples, the food flows may be determined for a region. In an example embodiment, regions may be at a county-by-county spatial scale.

These embodiments rely on developing a Food Flow Model. More specifically, the Food Flow Model provides a way for food flows between regions, in the form of counties and county equivalents, in the United States to be determined and mapped. The Food Flow Model is a data-driven methodology to estimate spatially explicit commodity flows. The commodity flow model integrates machine learning, network properties, production and consumption statistics, mass balance constraints, and linear programming. While the embodiments herein are focused on food flows in the United States, the modeling technique set forth may be used to determine food flows in other countries, as well as the flow of other types of commodities in the United States and elsewhere.

First, food flows are constrained to have the same network properties as those of observed food flow networks, specifically a gamma mass flux distribution. Second, the model is mass-balanced by requiring that the sum of food flows from counties within a Freight Analysis Framework (FAF) zone is equal to or greater than the food flows from that FAF zone. The performance of this approach is shown experimentally on a map depicting total commodity flow potentials between county pairs.

Information relating to commodity flows, and specifically food flows, exists generally and at a broad spatial level throughout the United States. This general information can be used to develop a Food Flow Model to estimate food flows at a more narrow spatial level where empirical flow data and information do not exist. Thereafter, the estimated food flows can be mapped to display movements between locations which a user can further manipulate. As noted, the discussed method may also be applied to determining other commodity flows between regions.

In a specific embodiment, food flows between counties can be determined and mapped. Food flows may be an example of a commodity flow for which a flow potential may be mapped. Once mapped, these food flows between counties can be used to determine vulnerabilities within a national food supply chain, critical infrastructures in food supply chains, and they can enable spatially detailed footprint assessments.

Food supply chains representing food flow potentials between county pairs offer a complex industry to map and model. The movement of food through complex supply chains within a country is referred to as a "food flow", or a food flow network. Food flow networks depend on many factors, such as production locations, population centers, storage and transport infrastructure, and socio-political factors. It is increasingly important to evaluate food flow networks, since these coupled human-natural systems can have dramatic implications for the environment and food security. Spatially detailed food flow maps might improve understanding of food supply chain vulnerabilities and enable spatially detailed footprint assessments.

For example, a link with a relatively high food flow between two counties may indicate a large amount of truck and/or train transport of food between these counties. Therefore, disruptions to transit service in either county could put the food supply at risk. When such a vulnerability is identified, steps can be taken to develop alternative routes for food flows, such as building out parallel transportation infrastructure in these or other counties.

The United States is a key country in the global food system. The ability to grow and transport agricultural products enables the United States to provide both domestic and global food security. The United States is able to maintain its role as a key agricultural producer, consumer, and trade power due in part to its supporting institutions (e.g. agricultural subsidies, crop insurance, etc.) and infrastructure (e.g. irrigation systems, food distribution infrastructure, etc.).

Data on subnational food flows is available within the United States (US) at a coarse spatial resolution. The US Census Bureau and the Bureau of Transportation Statistics produce a Commodity Flow Survey (CFS) every five years providing data on the movement of commodities in the United States, including their value, weight, and mode of transportation, as well as the origin and destination of shipments from manufacturing, mining, wholesale, and selected retail and services establishments. The Freight Analysis Framework (FAF) builds on the CFS data to provide data on freight movement between the 132 FAF zones of the US. The FAF reports flows of coarse food commodity classes. The classes are identified by Standard Classification of Transported Goods (SCTG) codes. For example, in one embodiment, the computing system may use SCTG code 1 Animals and Fish (live), SCTG code 2 Cereal Grains (includes seed), SCTG code 3 Agricultural Products (excludes animal feed, cereal grains, and forage products), SCTG code 4 Animal Feed, Eggs, Honey, and Other Products of Animal Origin, SCTG code 5 Meat, Poultry, Fish, Seafood, and their Preparations, SCTG code 6 Milled Grain Products and Preparations, and Bakery Products, and SCTG code 7 Other Prepared Foodstuffs, Fats and Oil. This census information on food flows within the US has been used to evaluate their vulnerabilities only at a relatively coarse spatial scale that prevents identification of vulnerabilities at a county level.

The spatially-refined food flows developed herein are at a more granular scale. Accordingly, they enable future research to better understand the potential vulnerabilities and resiliencies within the US food supply chain, and advance lifecycle and footprint assessments. These spatially detailed food flows may also enable, among other uses, determining infrastructure siting, such as locating biofuel refineries or cold-chain facilities.

II. EXAMPLE COMPUTING DEVICES AND CLOUD-BASED COMPUTING ENVIRONMENTS

The machine-learning-based and linear-programming-based solutions provided by the embodiments herein rely upon one or more computing systems to model and calculate food flows at a county level. Examples of such computing systems are described below.

FIG. 1 is a simplified block diagram exemplifying a computing device 100, illustrating some of the functional components that could be included in a computing device arranged to operate in accordance with the embodiments herein. Example computing device 100 could be a personal computer (PC), laptop, server, or some other type of computational platform. For purposes of simplicity, this specification may equate computing device 100 to a server from time to time, and may also refer to some or all of the components of computing device 100 as a "processing unit." Nonetheless, it should be understood that the description of computing device 100 could apply to any component used for the purposes described herein.

In this example, computing device 100 includes a processor 102, a data storage 104, a network interface 106, and an input/output function 108, all of which may be coupled by a system bus 110 or a similar mechanism. Processor 102 can include one or more CPUs, such as one or more general purpose processors and/or one or more dedicated processors (e.g., application specific integrated circuits (ASICs), graphical processing units (GPUs), digital signal processors (DSPs), network processors, etc.).

Data storage 104, in turn, may comprise volatile and/or non-volatile data storage and can be integrated in whole or in part with processor 102. Data storage 104 can hold program instructions, executable by processor 102, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 104 may contain program instructions, perhaps stored on a non-transitory, computer-readable medium, executable by processor 102 to carry out any of the methods, processes, or functions disclosed in this specification or the accompanying drawings.

Network interface 106 may take the form of a wireline connection, such as an Ethernet, Token Ring, or T-carrier connection. Network interface 106 may also take the form of a wireless connection, such as IEEE 802.11 (Wifi), BLUETOOTH®, or a wide-area wireless connection. However, other forms of physical layer connections and other types of standard or proprietary communication protocols may be used over network interface 106. Furthermore, network interface 106 may comprise multiple physical interfaces.

Input/output function 108 may facilitate user interaction with example computing device 100. Input/output function 108 may comprise multiple types of input devices, such as a keyboard, a mouse, a touch screen, and so on. Similarly, input/output function 108 may comprise multiple types of output devices, such as a screen, monitor, printer, or one or more light emitting diodes (LEDs). Additionally or alternatively, example computing device 100 may support remote access from another device, via network interface 106 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 2:
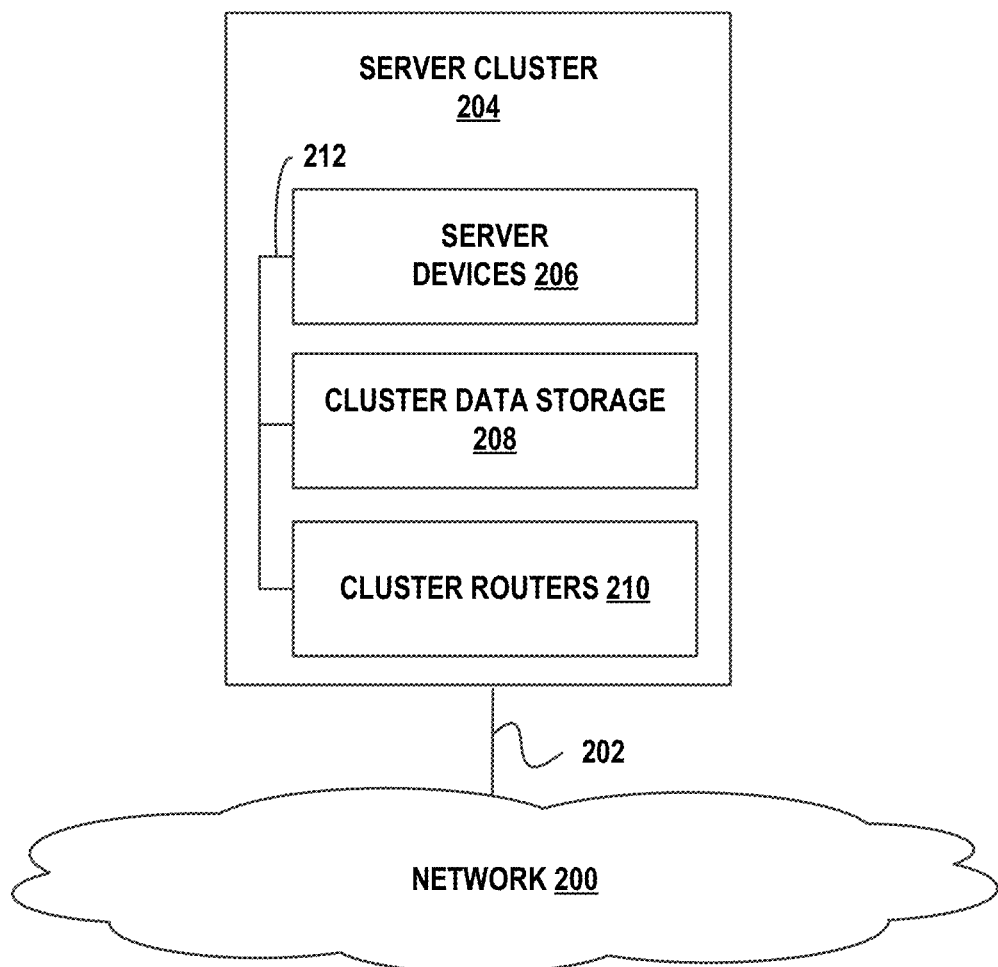
FIG. 2 illustrates a clustered computing device, in accordance with example embodiments.

FIG. 2 depicts a cloud-based server cluster 204 in accordance with an example embodiment. In FIG. 2, functions of computing device 100 may be distributed between server devices 206, cluster data storage 208, and cluster routers 210, all of which may be connected by local cluster network 212. The number of server devices, cluster data storages, and cluster routers in server cluster 204 may depend on the computing task(s) and/or applications assigned to server cluster 204.

For example, server devices 206 can be configured to perform various computing tasks of computing device 100. Thus, computing tasks can be distributed among one or more of server devices 206. To the extent that these computing tasks can be performed in parallel, such a distribution of tasks may reduce the total time to complete these tasks and return a result.

Cluster data storage 208 may be data storage arrays that include disk array controllers configured to manage read and write access to groups of hard disk drives and/or solid state drives. The disk array controllers, alone or in conjunction with server devices 206, may also be configured to manage backup or redundant copies of the data stored in cluster data storage 308 to protect against disk drive failures or other types of failures that prevent one or more of server devices 206 from accessing units of cluster data storage 208.

Cluster routers 210 may include networking equipment configured to provide internal and external communications for the server clusters. For example, cluster routers 210 may include one or more packet-switching and/or routing devices configured to provide (i) network communications between server devices 206 and cluster data storage 208 via cluster network 212, and/or (ii) network communications between the server cluster 204 and other devices via communication link 202 to network 200.

Additionally, the configuration of cluster routers 210 can be based at least in part on the data communication requirements of server devices 206 and cluster data storage 208, the latency and throughput of the local cluster network 212, the latency, throughput, and cost of communication link 202, and/or other factors that may contribute to the cost, speed, fault-tolerance, resiliency, efficiency and/or other design goals of the system architecture.

As noted, server devices 206 may be configured to transmit data to and receive data from cluster data storage 208. This transmission and retrieval may take the form of SQL queries or other types of database queries, and the output of such queries, respectively. Additional text, images, video, and/or audio may be included as well. Furthermore, server devices 306 may organize the received data into web page or web application representations. Such a representation may take the form of a markup language, such as the hypertext markup language (HTML), the extensible markup language (XML), or some other standardized or proprietary format. Moreover, server devices 206 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® or other languages may be used to facilitate generation of web pages and/or to provide web application functionality.

III. EXAMPLE MODEL TRAINING METHODS

Figure 3A:
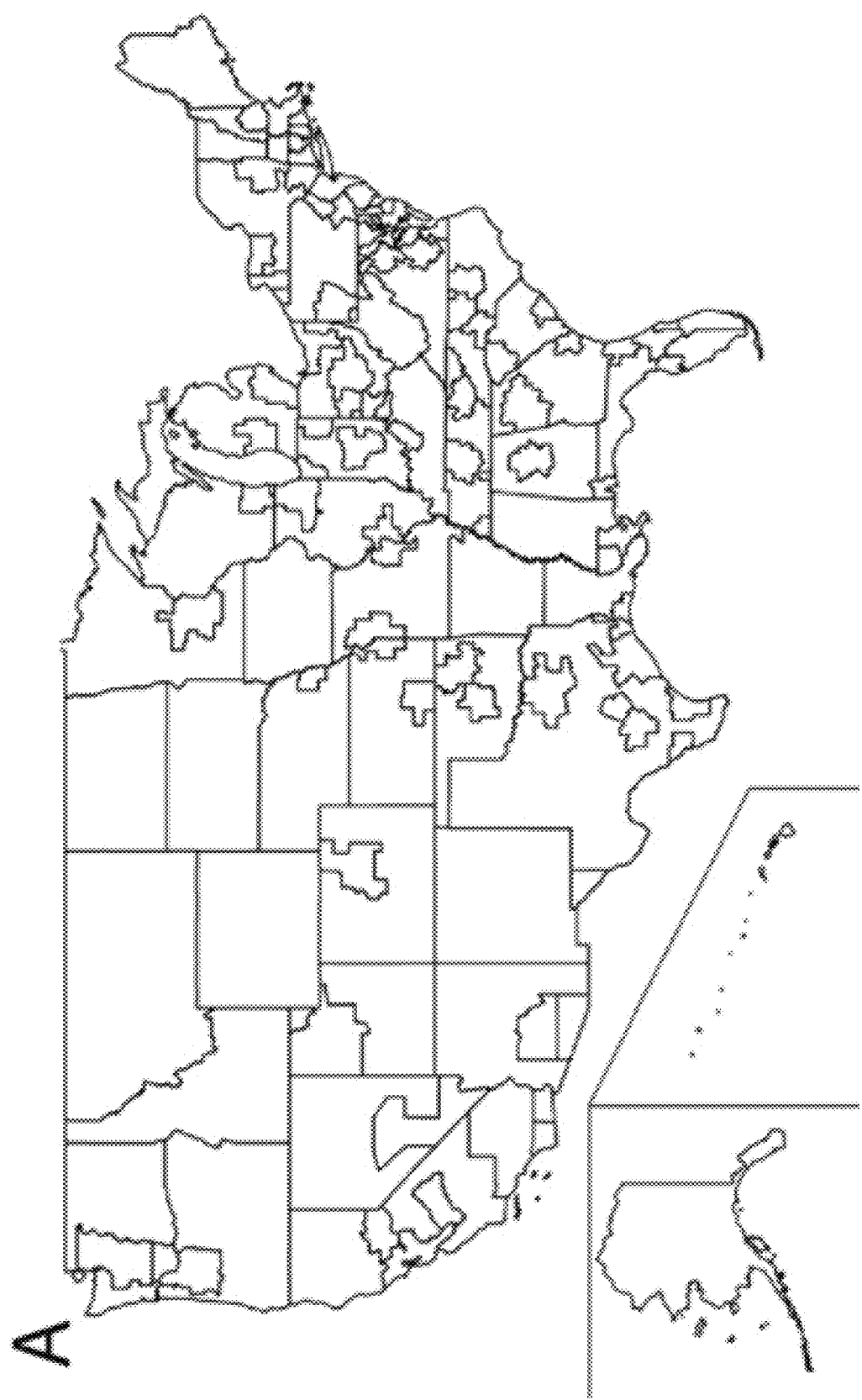
FIG. 3A illustrates Freight Analysis Framework zones of the United States, in accordance with example embodiments.
Figure 3B:
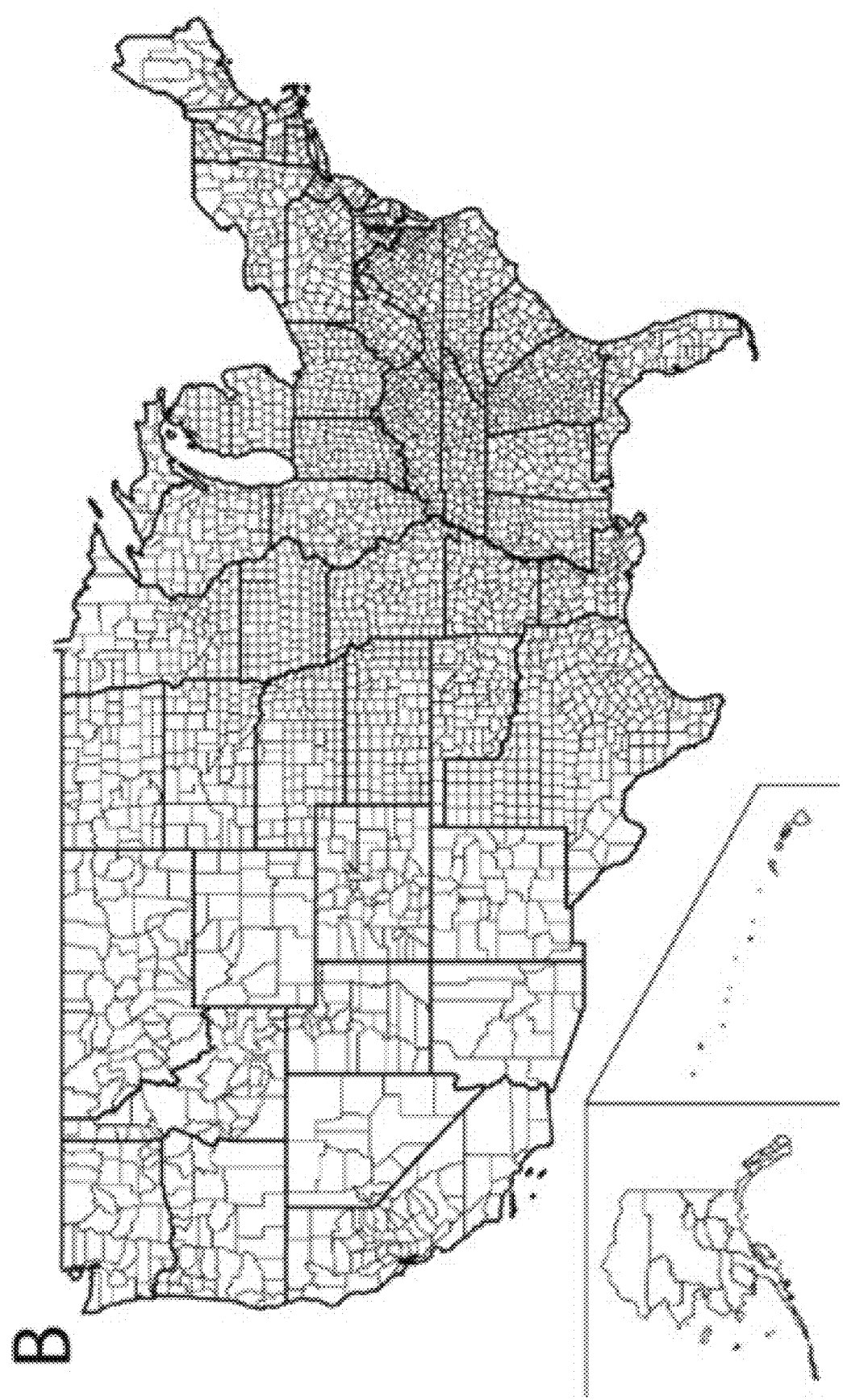
FIG. 3B illustrates regions of the Freight Analysis Framework zones at a county spatial scale, in accordance with example embodiments.

In an example embodiment, a method may include training, by a computing system, a two part hurdle model to develop a food flow model from a FAF zone spatial scale, as shown in FIG. 3A to a region spatial scale, as shown in FIG. 3B. In an example embodiment the regions may be counties. The model involves the estimation of flows between county pairs. Determining flows at a county spatial scale is a much finer spatial resolution than the FAF zone spatial scale. Since the number of directed paths is determined by (n)(n−1), this means that the method for training the model must move from a system with 17,292 potential links (n=132 at FAF zone scale) to estimating 9,869,022 potential links (n=3142 at county scale). As such, flow estimation increases in complexity and computational demand. The method for developing a county level food flow includes downscaling flows, which requires estimating values (including zeros) between all node pairs (i.e. links between counties) in the system.

Figure 4:
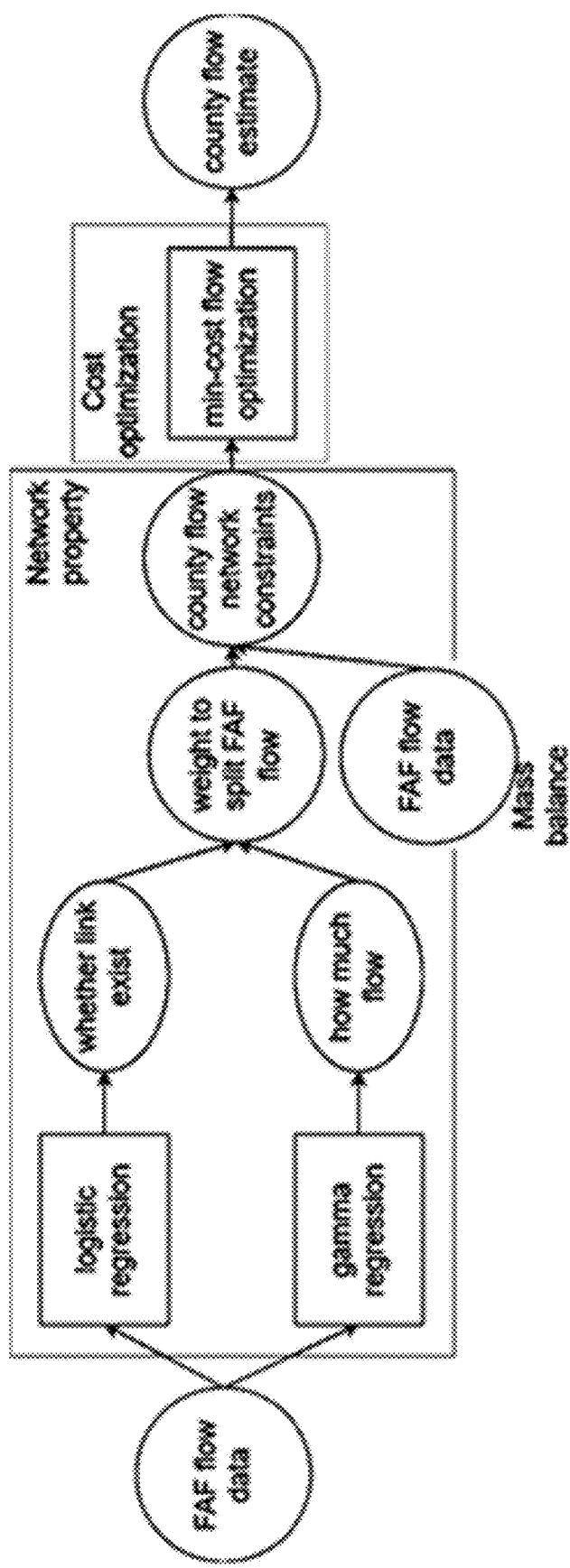
FIG. 4 illustrates a schematic of a modeling approach for commodity flow potentials, in accordance with example embodiments.

To downscale flows, the Food Flow Model was developed as an example embodiment of a Commodity Flow Model. The Food Flow Model is a computational algorithm that integrates machine learning, linear programming, network constraints, and mass balance. FIG. 4 is a schematic diagram illustrating such a modeling approach. The method can incorporate known properties of food flow networks at different spatial scales through the development of a gamma mixture hurdle model. This approach attempts to ensure that estimated mass fluxes follow a gamma distribution as in empirical food and commodity networks.

In an example embodiment, supervised learning can be used to establish a gamma mixture hurdle model at the FAF spatial scale and estimate food flow potentials between counties. This approach incorporates statistical information on economic factors of production at the county spatial scale. This can allow for food transfers to be assigned as predicted links only if food is produced and consumed in locations. Additionally, the structure of a gravity model of trade equation can be incorporated into the gamma mixture hurdle model. Data on food transfers at the FAF spatial resolution can then be used to constrain the county scale estimates. Finally, the Food Flow Model can incorporate linear programming to solve the system through the minimization of the transport distance between counties.

The Food Flow Model can determine flows between geographic zones at a county level spatial scale. Therefore, a weighted and directed matrix of commodity flows between all county pairs can be estimated from an origin county to a destination county. In an example embodiment, the approach is based on supervised-learning and linear programming methods with mass balance and commodity network properties as constraints.

More particularly, an example embodiment may include training, by a computing system, a gamma mixture hurdle model characterizing a functional relationship between output data specifying food flows between zones, and input variables representing food production and food consumption in the zones. The output data for training the gamma hurdle model may be obtained from The Freight Analysis Framework Version 4 (FAF4) database for Shipping Zones. These are non-overlapping geographic zones and may specify food flows for a particular type of food. The FAF4 database provides empirical agricultural and food commodity transfers between FAF zones. The output data may also be based on food-related energy sources and transport corridors. The input data may include statistical information on economic production within each US county such as food production and food consumption for the particular type of food. A list of data sources is shown in Table 1.

TABLE 1

| Name | References | Data Description | Purpose |
| --- | --- | --- | --- |
| Commodity Flow Survey Public Use Microdata | US Census Bureau | Survey of business shipments within the United States. FAF is largely based off this dataset, though the scope of the CFS Microdata is not as broad as that of the | This dataset allowed for pairing of commodity transfers to specific industries. |

TABLE 1-continued

| Name | References | Data Description | Purpose |
|---|---|---|---|
| Freight Analysis Framework Version 4 | Oak Ridge National Laboratory | FAF dataset. However, the CFS Microdata contains greater shipment detail, including the NAICS industry responsible for the shipment. Data detailing freight movement between 132 major metropolitan areas and remainder of states (i.e. FAF Zones), as well as eight international import/export regions. | FAF commodity transfers are used to constrain county transfers. The sum of county transfers must equal that of the FAF Zone that they belong. |
| US Census Bureau Economic Censuses | US Census Bureau | Provides county level economic data by industry, including employment and the value of industry output. | The Economic Census was used to determine production of processed agricultural goods and the total production output of all industries using agricultural goods as production inputs. These data were used in our gamma mixture hurdle model for link prediction and assigning flow strength. |
| US Department of Agriculture Censuses of Agriculture | US Department of Agriculture | Agricultural production data for each crop or livestock type at the county scale. | The Census of Agriculture was used to determine county level production values for each crop and livestock. These data were used in our gamma mixture hurdle model for link prediction and assigning flow strength. |
| Input-Output Accounts Data | US Bureau of Economic Analysis | These data detail supply chain input requirements for each industry per unit of their output. | Direct requirement coefficients from the I-O accounts were multiplied by production data to determine the commodity input requirements of each industry, as well as end consumers. A county's total input requirement of a commodity across all industries and end consumers represents its total consumption of that good. This is used in our gamma mixture hurdle model for link prediction and assigning flow strength. |
| County-to-County Distance Matrix and Network Impendence | Oak Ridge National Laboratory | Matrix of distances and impedances between county centroids via Different transportation methods. | The linear programming algorithm used this matrix to minimize transportation cost. |
| Personal Income | US Bureau of Economic Analysis | Personal income data per county. | When paired with the input-output data tables, this was used to help determine final consumer demand of different commodities within a county. |
| Port Trade | US Census Bureau | Value ($) and mass (kg) trade data for international ports of the United States. | Trade data to/from these ports was used to better capture transit hubs in the gamma mixture model. |

An example embodiment may analyze data related to agriculture and food goods, which are represented by SCTG codes 01-07 as shown in Table 2.

TABLE 2

| SCTG | Model |
|---|---|
| 01 | Animals and fish (live) |
| 02 | Cereal grains (includes seed) |
| 03 | Agricultural products (excludes animal feed, cereal grains, and forage products) |
| 04 | Animal feed, eggs, honey, and other products of animal origin |
| 05 | Meat, poultry, fish, seafood, and their preparations |
| 06 | Milled grain products and preparations, and bakery products |
| 07 | Other prepared foodstuffs, fats and oils |

In an example embodiment, other statistical information can also be used to determine the destination of food flows. The 2012 CFS Public Use Microdata and the United States Bureau of Economic Analysis input-output accounts data can be used to statistically determine the production and attraction of food within the machine learning algorithm. The CFS Microdata utilizes the same survey data as the CFS dataset but provides greater shipment detail than the standard CFS data. One additional detail included in the CFS Microdata is the North American Industry Classification System (NAICS) code of the industry producing and shipping the good. This additional information enables a computing system to relate the SCTG code of a transported commodity to the NAICS industry producing the commodity. Since the CFS Microdata does not provide a NAICS code for raw agricultural and food goods (SCTG01-04), a computing system can match the production of individual crops or livestock reported by US Department of Agriculture to the SCTG code to which it belongs. The SCTG-NAICS crosswalk table created can be paired with input-output accounts data to determine an industry's use of each SCTG as input in its production process. Input-output tables show to what degree the production (output) of one industry is used as input to another industry. Using the crosswalk table, industry output within the table can be aggregated to its corresponding SCTG code to match the FAF4 data set. This procedure can restrict data used within the machine learning algorithm to variables that have been established as relevant to the production or consumption of each SCTG good to maintain realism.

Moreover, some agricultural and business production data may be suppressed by the data collecting agency if their release may reveal information on an individual producer. In an example embodiment, suppressed data records are not removed from the data set, but instead flagged, indicating there are limited producers within that geographic area. Data suppression is more prevalent at the county spatial scale and among specialty producers. For example, artichoke (a specialty crop) production in Linn County, Oregon is flagged since reporting this data would reveal information specific to the only artichoke farmer in the county. When suppressed values arise in the data sets, the geographic and industry/product hierarchical structure of the data is exploited to estimate these suppressed values. The artichoke production of the sole farmer in Linn County, for example, was estimated by subtracting the sum of all artichoke production in Oregon counties from the state-level production value provided by US Department of Agriculture. The difference between the state total and the sum of all counties is uniformly distributed amongst all Oregon counties with suppressed artichoke production records.

Industrial production records have other data fields that can help further refine estimates of suppressed production values. US Census Bureau provides employment records for each industry at the county scale, which can be used to help estimate suppressed production output. In an example embodiment, employment data is not used directly within the model. Instead, it is used to estimate the production output (which is used within the model as an input) when this production data has been suppressed. Employment data is more widely reported and is not subject to as strict data suppression requirements as production data. For each industry, numerous instances when both production and employment data existed was exploited to establish coefficients relating the number of employees working within an industry to the production of that industry. These industry-specific coefficients were applied to employment records to estimate production when production data was suppressed within a given county. Relationships between production output and employment were established for every industry based on the large number of records where both values were provided. This allowed the computing system to estimate production for counties with few food producers.

Port trade data can be retrieved from the Census Bureau USA Trade database. The values (e.g., in dollars) and mass (e.g., in kilograms) for both sea and air ports are provided. Value flows were ultimately used due to significantly more data availability as compared to mass. While land ports are not specifically mentioned, many of the reported ports are US Customs and Border Patrol crossings on US land borders, implying that land ports are included in the database. For example, land ports exist between the US and Canada along the Northern borders of North Dakota and Montana. Commodities in the port trade database are reported using the HS coding system. For consistency with FAF flow data, a crosswalk was created to convert from HS to SCTG codes. The computing system could then determine latitude and longitude coordinates for each port. Some ports, such as a 'Low Value (Port)', did not have locations and were consequently removed. A spatial join was finally used to determine which county each port is in, resulting in 331 ports in 228 counties contributing inflows and outflows of SCTGs 1 through 7 in the US. This port data may be used to boost fluxes to/from transit hubs that do not directly correspond to production/consumption flows.

As previously discussed, in an example embodiment, the previously mentioned data may be used to train a gamma mixture hurdle model to estimate food flows between FAF zones, and to in turn determine food flows at more narrow spatial view. The training may involve: (i) using binary logistic regression to estimate whether corresponding food flows exist between pairs of the zones, and (ii) for pairs of the zones in which the corresponding food flows are estimated to exist, using a gamma mixture model to estimate amounts of the corresponding food flows. Each zone includes a respective set of regions and wherein the regions are non-overlapping geographic regions. Further, the regions may be counties. Thus, the respective set of regions within each zone may be a plurality of counties within each zone.

As shown in FIG. 4, the training utilizes a logistic regression model on the FAF flow data. Food flow networks may exhibit connectivity distributions that follow the generalized exponential-binomial distribution across scales. This indicates that link generation can be modeled as a two-step process.

First, the probability (p) may be sampled from a prior generalized exponential distribution that a food flow exists between a particular pair of the zones. Second, a computer program can be used to obtain a value between 0 and 1. If the obtained value is greater than p then a connection is made between an origin and destination node, because a food flow is determined to exist between that particular pair of zones. Logistic regression can be used to take additional geographic and economic features of the regions into account. The binary logistic regression model can estimate the probability of a binary response based on available predictor (or independent) variables. In binary logistic regression, the outcome is coded as '0' or '1'. Here, an outcome of '0' indicates that no link is present between two nodes, while an outcome of '1' indicates that a link exists.

Supervised learning can be used to determine the functional form of the logistic model for each SCTG food group. Supervised learning is a machine learning task to learn the function that maps an input to an output. This learning process infers a function from training data. Here, the available FAF zone food flow data may be used as the training data set, so 17,292 data points may be available in the training data set. Using supervised learning, a logistic regression model can be established for each SCTG food commodity group.

Example model variables are defined in FIG. 5. The result of logistic regression for each SCTG food group is provided below in Table 3:

TABLE 3

| SCTG | Model |
|---|---|
| 01 | logit(A1) = −2.60 log(D) − 0.68 log(GDPo) + 0.43 log(GDPd) + 1.44 log(POPo) + 0.03 log(R1d) + 0.04 log(S1d) + 0.14 log(LIVEo) + 18.32 |
| 02 | logit(A2) = −2.13006975 log(D) + 0.58 log(GDPo) + 0.34 log(GDPd) − 0.59 log(POPo) + 0.37 log(Po) + 0.03 log(O1d) + 0.14 log(C1d) + 0.10 log(G1d) + 6.63 |
| 03 | logit(A3) = −0.65 log(D) + 0.51 log(POPo) + 0.56 log(POPd) + 0.42 log(Po) + 0.03 log(F4d) + 0.04 log(S6d) + 0.00 log(F1d) − 0.30 |
| 04 | logit(A4) = −1.71 log(D) + 0.22 log(GDPo) + 0.48 log(POPd) + 0.43 log(Po) + 0.05 log(11d) + 0.03 log(O1d) + 0.09 log(G1d) + 0.08 log(S5d) + 3.55 |
| 05 | logit(A5) = −1.19 log(D) + 0.21 log(GDPd) + 0.43 log(POPd) + 0.19 log(F2d) + 0.18 log(W1d) + 0.06 log(A1o) + 0.09 log(M1o) + 0.05 log(R2o) + 0.06 log(S1o) + 0.32 log(INDo) + 0.13 log(C1o) − 0.22 log(G1o) + 0.18 log(H1o) − 9.56 |
| 06 | logit(A6) = −1.13 log(D) − 0.04 log(GDPo) + 0.06 log(GDPd) + 0.42 log(POPd) + 0.39 log(G2d) + 0.02 log(S3d) + 0.59 log(B1o) + 0.32 log(INDo) + 0.08 log(G1d) − 9.72 |
| 07 | logit(A7) = − 1.40 log(D) − 0.72 log(POPo) + 0.01 log(A2d) + 0.02 log(C3d) + 0.26 log(F2d) + 0.25 log(G3d) + 0.31 log(G2d) + 0.03 log(O1d) + 0.02 log(S4d) + 0.14 log(W1d) + 0.02 log(A3o) + 0.06 log(D1o) + 0.07 log(F3o) + 0.02 log(O2o) + 0.02 log(S4o) + 0.03 log(S2o) + 0.67 log(INDo) + 0.02 log(C2o) + 0.15 log(S5o) + 0.04 log(T1o) + 0.74 |

As indicated in FIG. 4, the logistic regression model can determine the presence or absence of a food flow link. If a food flow link is predicted to exist, then the 'hurdle' of the gamma mixture model has been cleared. Once the hurdle has been cleared, then a gamma regression model is used to estimate the mass transfer on that link.

The area under the curve (AUC) metric with tenfold cross-validation can be used to evaluate model performance. AUC can measure the entire two-dimensional area below the receiver operating characteristic (ROC) curve from (0, 0) to (1, 1). AUC can provide an aggregate measure of performance across all possible classification thresholds. AUC is scale invariant and classification-threshold-invariant. It can measure how well predictions are ranked, rather than their absolute values. Additionally, AUC can measure the quality of the model's predictions irrespective of what classification threshold is chosen. AUC values range from 0 to 1. A model whose predictions are 100% wrong has an AUC of 0.0; one whose predictions are 100% correct has an AUC of 1.0. A score of 0.5 is no better than random chance. There is a tradeoff between precision and overfitting. A score of 0.9 indicates a very good model, but a score of 0.9999 may be too good to be true and can indicate overfitting.

Second, as shown in FIG. 4, for pairs of the zones in which the corresponding food flows are estimated to exist, the computing system uses a gamma mixture model to estimate amounts of the corresponding food flows. Food mass flux distributions may follow the gamma distribution across scales. The gamma distribution can be generated from the homogeneous Poisson process. For this reason, the food flow process can be modeled using a Poisson process. Conceptually, this implies that food commodities can be transported from the origin to the destination until k (shape of gamma distribution) effective units of the food commodity are delivered.

To understand this 'effectiveness', consider the example of animal feed. A feed manufacturer needs to produce a certain amount of feed containing k units of corn. The origin ships corn, but not all corn ends up in the feed. Some corn might be lost during transport, some corn might be sent to other manufacturing plants or used for other purposes besides feed, and some corn might be re-exported. So, the corn that finally reaches the feed manufacturer is only a fraction, and this fraction is the success rate. Here, this success rate is approximated as a constant within each food commodity category. The gamma regression model for each SCTG group is provided below in Table 4:

TABLE 4

| SCTG | Model |
|---|---|
| 01 | ln(E(F1)) = −0.61 log(D) + 0.11 log(GDPo) + 0.05 log(M2d) + 0.08 log(P1d) + 0.10 log(R1d) + 0.21 log(H1o) + 0.17 log(LIVEo) |
| 02 | ln(E(F2)) = −0.62 log(D) + 0.59 log(Po) − 0.13 log(Pd) + 0.04 log(F1d) + 0.31 log(C1d) |
| 03 | ln(E(F3)) = −1.30 log(D) + 0.23 log(POPd) + 0.28 log(Po) − 0.08 log(Pd) + 0.04 log(F1d) + 12.06 |
| 04 | ln(E(F4)) = −0.89 log(D) + 0.54 log(GDPo) − 0.65 log(POPo) + 0.46 log(Po) − 0.20 log(Pd) + 0.03 log(O1d) + 0.38 log(C1d) |
| 05 | ln(E(F5)) = −0.71 log(D) + 0.03 log(O1d) + 0.33 log(Po) + 0.12 log(C1o) + 0.08 log(C2o) + 0.12 log(H1o) |

TABLE 4-continued

| SCTG | Model |
|---|---|
| 06 | ln(E(F6)) = −0.77 log(D) + 0.03 log(F5d) + 0.35 log(G2d) + 0.04 log(S2d) + 0.08 log(S7d) + 0.12 log(G4o) + 0.05 log(G5o) + 0.12 log(Po) |
| 07 | ln(E(F7)) = −1.35 log(D) + 0.02 log(D2d) + 0.03 log(F5d) + 0.44 log(G3d) + 0.03 log(S4d) + 0.57 log(Po) + 0.28 log(C1o) |

For most food commodity groups, about 5% of the flows exceed the upper bound of the 95% confidence interval of the gamma regression model. These outliers correspond to major transportation hubs within the US (e.g. ports). Based on this, transit hubs can be considered as an additional attribute for some key nodes. The port trade data from the Census Bureau USA Trade database can be used for these hubs. The same process can be employed to generate the second gamma model with the port trade data. In this way, the gamma mixture model is developed. In the gamma mixture model, there are two gamma regression models with different feature spaces. The gamma mixture model is further based on a linear combination of gamma function regressions representing the corresponding food flows. So, the gamma mixture hurdle model combines (i) supervised learning to establish a logistic regression model for link prediction and (ii) a gamma mixture model to estimate the mass of estimated links, taking transit hubs into account.

IV. EXAMPLE APPLICATIONS OF TRAINED MODELS

Once trained, in an example embodiment, the gamma mixture hurdle model can be used to simulate food flow potentials between regions, specifically counties. Based on parameters of the gamma mixture hurdle model, the computing system can estimate: (i) whether corresponding food sub-flows exist between pairs of the regions, and (ii) for pairs of the regions in which the corresponding food sub-flows are estimated to exist, potentials of the corresponding food sub-flows.

The logistic regression model developed for each SCTG food commodity can be used to decide the topology of food flows at a region, or county, level. Continuing with the embodiment illustrated by FIG. 4, if the probability that a flow between two regions is greater than a selected threshold between 0 and 1, a link is assigned. Next, the mass flux of food flows can be estimated for existing links. Gamma regression (without total importing information of international ports) can be used to estimate the expected value of the food flows between counties. Flow potentials can be generated as random variables sampled from a gamma distribution with the expected values of these food flows as the scale of the gamma model. If there exists potentials between FAF zones summing to a value smaller than reported flow between these FAF zones, the gamma regression with total importing information of international ports can be used to re-estimate the expected values between these regions. If the total of flows among regions between FAF zones are still smaller than the reported value, scaling the flow potential for the zone to be commensurate with the reported flow for the zone is used.

The system can then be solved to determine food flows between regions. As an example, FIG. 6 displays the output map for the food flow potentials between counties, in an example embodiment. Using a linear programming framework, the computing system can determine values for the corresponding food sub-flows between regions. To solve the system, the linear programming framework may use data specifying food flows as mass balance constraints on totals of the corresponding food sub-flows that are within each of the zones, the potential for food flow between zones as inequality constraints on the corresponding food sub-flows that are within each of the zones, and region-to-region distance data for the regions as a minimization constraint on the corresponding food sub-flows.

Given the network topology and flow potentials estimated in developing the gamma mixture hurdle model at FAF zone scale and the commodity flow potentials between regions, particularly counties, is simulated, the flows between counties can be estimated with minimization of distance as the objective function and flow values reported at FAF level as equality constraints. This is also shown in FIG. 4.

In simulating flows between counties, it can be determined that the sum of the flow potentials among counties within an FAF zone may be greater than or equal to the corresponding FAF zone flows. In an example embodiment, the solution to the linear programming system minimizes transport distance while ensuring mass balance between counties modeled within an FAF zone. In this way, the approach builds on the gravity model of trade in which distance (which typically correlates with costs) is inversely related to trade flows. The region-to-region distance data may be calculated as a great circle distance between region centroids. The great circle distance is estimated by: determining a central angle of each region centroid; and multiplying Earth's radius and the central angle of each region centroid.

Note that the Food Flow Model can estimate self-loops at the county scale. This is because self-loops exist in the FAF data. For example, the remainder of California reports a flow to the remainder of California, such that the remainder of California is both the origin and destination of the flow. Therefore, corresponding food sub-flows can be estimated for a region that is both an origin region and a destination region.

In some scenarios, the map of region food flows could be displayed. A computing device may first receive information indicative of a plurality of geographic zones. The information indicative of a plurality of geographic zones may be at a county spatial scale. The geographic zones could include finer scale (e.g., higher spatial resolution) or coarser scale (e.g., lower spatial resolution). As an example, the geographic zones could include a plurality of neighborhoods, city blocks, or other types and/or sizes of geographic zones.

Based on the trained two-part hurdle model from above, the information indicative of a plurality of zones is uploaded into the model to determine a commodity flow potential for at least one pair of geographic zones of the plurality of geographic zones. The commodity flow potential for at least one pair of geographic zones may be at a county spatial scale. The county spatial scale provides greater resolution and precision for commodity flow data. This allows for it to be used to gather greater information on the industries and on the infrastructure supporting them. At the county spatial level, one pair of geographic zones linked together by the commodity flow potential is two counties. In an example embodiment, the commodity flow potential for at least one pair of geographic zones at the county spatial scale could represent a prediction of the movement of food from one county to another.

Once a commodity flow potential for at least one pair of geographic zones is determined, the results could be displayed on a display or another type of user interface. In an example embodiment, the geographic zones may be at the county spatial scale and displaying of the commodity flow potentials may be illustrated in the form of lines connecting counties on a map. In another embodiment, the display of the commodity flow potentials may be in the form of a readable output listing all of the county links and their commodity flow potentials. In various embodiments, such output information may be further manipulated by a user by way of a user interface. For example, in response to receiving specific geographic inputs at a user interface of a computing device, the computing device may output the commodity flow potentials corresponding to the specific geographic inputs. The specific geographic inputs at a user interface may be county inputs. The output information may be manipulated further still by receiving, at a user interface, a limitation on the number of commodity flow potentials. Such a limitation may restrict the number of commodity flow potentials depicted on the map. Finally, the computing system may send an alert or another type of notification to a user based on a commodity flow potential being above or below a threshold value.

In an example embodiment, after links between geographic zones at a county spatial scale have been determined, a minimum transport distance between the pair of geographic zones could be determined. Such transport distances/routes could be displayed with respect to the commodity flow potentials. In an example embodiment, a map depicting the commodity flow potential for at least one pair of geographic zones at the county spatial scale could also depict or display the shortest transport distance. In this way, the map may also be used to display food fluxes along transportation infrastructure.

In some embodiments, flow potentials of small geographic areas may be monitored by comparing the total of the flow potentials in the small geographic areas to the flow potential of a large geographic area encompassing the small geographic areas. In an example embodiment, to confirm the accuracy of flow potentials at the county spatial level, the sum of the commodity flow potentials of geographic zones at a county spatial scale within a corresponding geographic zone may be equal to or greater than a commodity flow potential for the corresponding geographic zone which the geographic zones at a county spatial scale are within.

V. EXAMPLE OPERATIONS

Figure 7:
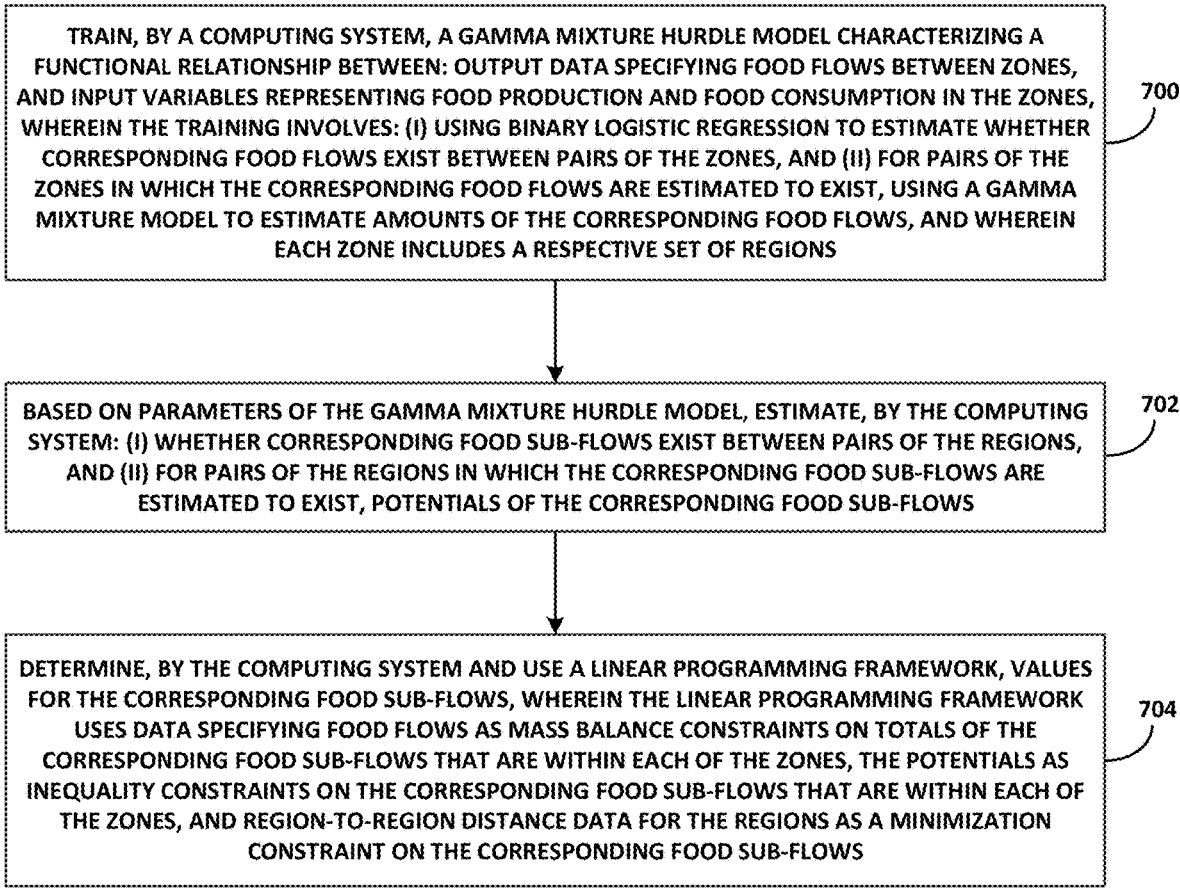
FIG. 7 is a flow chart, in accordance with example embodiments.

FIG. 7 is a flow chart illustrating an example embodiment. The process illustrated by FIG. 7 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 may involve training, by a computing system, a gamma mixture hurdle model characterizing a functional relationship between: output data specifying food flows between zones, and input variables representing food production and food consumption in the zones, wherein the training involves: (i) using binary logistic regression to estimate whether corresponding food flows exist between pairs of the zones, and (ii) for pairs of the zones in which the corresponding food flows are estimated to exist, using a gamma mixture model to estimate amounts of the corresponding food flows, and wherein each zone includes a respective set of regions.

Block 702 may involve, possibly based on parameters of the gamma mixture hurdle model, estimating, by the computing system: (i) whether corresponding food sub-flows exist between pairs of the regions, and (ii) for pairs of the regions in which the corresponding food sub-flows are estimated to exist, potentials of the corresponding food sub-flows.

Block 704 may involve determining, by the computing system and using a linear programming framework, values for the corresponding food sub-flows, wherein the linear programming framework uses data specifying food flows as mass balance constraints on totals of the corresponding food sub-flows that are within each of the zones, the potentials as inequality constraints on the corresponding food sub-flows that are within each of the zones, and region-to-region distance data for the regions as a minimization constraint on the corresponding food sub-flows.

In some embodiments, the zones are non-overlapping geographic zones, and the regions are non-overlapping geographic regions.

In some embodiments, the regions are counties and wherein the respective set of regions within each zone include a plurality of counties.

In some embodiments, the output data specifies food flows for a particular type of food, and wherein the input variables represent food production and food consumption for the particular type of food.

In some embodiments, the output data specifying food flows between zones is based on food-related freight movement between the zones or food-related energy sources and transport corridors.

In some embodiments the gamma mixture model is based on a linear combination of gamma function regressions representing the corresponding food flows.

In some embodiments, the region-to-region distance data is a great circle distance between region centroids, wherein the great circle distance is estimated by: (i) determining a central angle of each region centroid, and (ii) multiplying Earth's radius and the central angle of each region centroid.

In some embodiments using binary logistic regression to estimate whether corresponding food flows exist between pairs of the zones involves: (i) sampling a probability from a prior generalized exponential distribution that a food flow exists between a particular pair of the zones, (ii) selecting a random value between 0 and 1, (iii) determining that the probability is greater than the random value, and (iv) based on the probability being greater than the random value, determining that the food flow exists between the particular pair of the zones.

In some embodiments, using the gamma mixture model to estimate amounts of the corresponding food flows includes modeling the food flows using Poisson processes.

In some embodiments, estimating the potentials of the corresponding food sub-flows comprises estimating potentials of the corresponding food sub-flows for a region that is both an origin region and a destination region.

In some embodiments, estimating the potentials of the corresponding food sub-flows involves: (i) determining a flow potential for a zone based on the potentials of the corresponding food sub-flows for regions within the zone, (ii) determining that the flow potential for the zone is lower than a reported flow for the zone, and (iii) re-estimating the potentials of the corresponding food sub-flows for regions within the zone using the gamma mixture model and food importing information from international ports.

In some embodiments, estimating the potentials of the corresponding food sub-flows further involves: (i) after re-estimating the potentials of the corresponding food sub-flows for regions within the zone, determining that the flow potential for the zone is still lower than the reported flow for the zone, and (ii) scaling the flow potential for the zone to be commensurate with the reported flow for the zone.

In some embodiments, using the gamma mixture model to estimate amounts of the corresponding food flows involves an indication of whether a transit hub contributes to the corresponding food flows.

VI. ADDITIONAL EXAMPLE EMBODIMENTS

Figure 6:
FIG. 6 illustrates an output map for food flow potentials between counties of the United States, in accordance with example embodiments.

FIG. 6 is a map illustrating food flow potentials, according to an example embodiment. In some examples, the map may be beneficially utilized to determine key threats to agricultural production and food transport in the U.S. Threats include the exposure of the U.S. food supply chain to unsustainable water use, weather extremes, other disruptions to food production, disruptions to transport infrastructure (e.g., roads, railways, bridges, etc.), and/or degraded transportation infrastructure. The threats and risks could be further displayed on a map using one or more example methods described in this disclosure.

The exposure of the food supply chain to unsustainable water use in agriculture can be systematically determined. The indirect exposure of a consuming location to water stress in the supply chain may be quantified by utilizing the input and output of a geographic zone at a county spatial scale versus the total exposer of a consuming node.

The method described in this disclosure may also utilize high quality and/or high resolution climate information to help determine potential climate shocks to agriculture. Such determinations could additionally or alternatively be mapped on the display with the commodity flow potentials. In another embodiment, example methods may be executed to determine whether degraded infrastructure may pose a potential threat to commodity flows between geographic zone pairs. In another example embodiment, the method may include considerations of all of unsustainable water use, weather extremes and degraded infrastructure. In such scenarios, all related determinations could be displayed together (e.g., overlaid) with commodity flow potentials.

In some examples, related results may be used to pinpoint key vulnerabilities and resiliencies in the U.S. food system. As an example, scenarios could include the simulation of random attacks to the infrastructure by artificially adjusting the links established between geographic zones as detailed in this disclosure. The attacks may be further carried out on links to a geographic zone that has been determined to be at a higher risk for unsustainable water use, weather extremes, or degraded infrastructure. Thus, the impact of an attack on any particular region to the overall food supply system integrity can be determined.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   training, by a computing system, a gamma mixture hurdle model characterizing a functional relationship between: output data specifying food flows between zones, and input variables representing food production and food consumption in the zones, wherein the training involves: (i) using binary logistic regression to estimate whether corresponding food flows exist between pairs of the zones, and (ii) for pairs of the zones in which the corresponding food flows are estimated to exist, using a gamma mixture model to estimate amounts of the corresponding food flows, and wherein each zone includes a respective set of regions;
   based on parameters of the gamma mixture hurdle model, estimating, by the computing system: (i) whether corresponding food sub-flows exist between pairs of the regions, and (ii) for pairs of the regions in which the corresponding food sub-flows are estimated to exist, potentials of the corresponding food sub-flows;
   determining, by the computing system and using a linear programming framework, values for the corresponding food sub-flows, wherein the linear programming framework uses data specifying food flows as mass balance constraints on totals of the corresponding food sub-flows that are within each of the zones, the potentials as inequality constraints on the corresponding food sub-flows that are within each of the zones, and region-to-region distance data for the regions as a minimization constraint on the corresponding food sub-flows;
   generating, based on the values for the corresponding food sub-flows, a map of simulated food flows between geographic regions;
   providing, for display on a graphical user interface, the map of simulated food flows between the geographic regions, wherein the corresponding food sub-flows are illustrated as lines connecting the geographic regions on the map; and
   receiving a limitation, via the graphical user interface, of the values for the corresponding food sub-flows to determine vulnerabilities in a food system, wherein limiting the corresponding food sub-flows comprises a change in the lines connecting the geographic regions on the map.

2. The method of claim 1, wherein the zones are non-overlapping geographic zones, and wherein the regions are non-overlapping geographic regions.

3. The method of claim 2, wherein the regions are counties and wherein a respective set of regions within each zone include a plurality of counties.

4. The method of claim 1, wherein the output data specifies food flows for a particular type of food, and wherein the input variables represent food production and food consumption for the particular type of food.

5. The method of claim 1, wherein the output data specifying food flows between zones is based on food-related freight movement between the zones or food-related energy sources and transport corridors.

6. The method of claim 1, wherein the gamma mixture model is based on a linear combination of gamma function regressions representing the corresponding food flows.

7. The method of claim 1, wherein the region-to-region distance data is a great circle distance between region centroids, and wherein the great circle distance is estimated by:
   determining a central angle of each region centroid; and
   multiplying Earth's radius and the central angle of each region centroid.

8. The method of claim 1, wherein using binary logistic regression to estimate whether corresponding food flows exist between pairs of the zones comprises:
   sampling a probability from a prior generalized exponential distribution that a food flow exists between a particular pair of the zones;
   selecting a random value between 0 and 1;
   determining that the probability is greater than the random value; and
   based on the probability being greater than the random value, determining that the food flow exists between the particular pair of the zones.

9. The method of claim 1, wherein using the gamma mixture model to estimate amounts of the corresponding food flows includes modeling the food flows using Poisson processes.

10. The method of claim 1, wherein estimating the potentials of the corresponding food sub-flows comprises estimating potentials of the corresponding food sub-flows for a region that is both an origin region and a destination region.

11. The method of claim 1, wherein estimating the potentials of the corresponding food sub-flows comprises:
    determining a flow potential for a zone based on the potentials of the corresponding food sub-flows for regions within the zone;
    determining that the flow potential for the zone is lower than a reported flow for the zone; and
    re-estimating the potentials of the corresponding food sub-flows for regions within the zone using the gamma mixture model and food importing information from international ports.

12. The method of claim 11, wherein estimating the potentials of the corresponding food sub-flows further comprises:
    after re-estimating the potentials of the corresponding food sub-flows for regions within the zone, determining that the flow potential for the zone is still lower than the reported flow for the zone; and
    scaling the flow potential for the zone to be commensurate with the reported flow for the zone.

13. The method of claim 1, wherein using the gamma mixture model to estimate amounts of the corresponding food flows comprises an indication of whether a transit hub contributes to the corresponding food flows.

14. An article of manufacture including a non-transitory computer-readable medium, having stored thereon program instructions that, upon execution by a computing system, cause the computing system to perform operations comprising:

training a gamma mixture hurdle model characterizing a functional relationship between: output data specifying food flows between zones, and input variables representing food production and food consumption in the zones, wherein the training involves: (i) using binary logistic regression to estimate whether corresponding food flows exist between pairs of the zones, and (ii) for pairs of the zones in which the corresponding food flows are estimated to exist, using a gamma mixture model to estimate amounts of the corresponding food flows, and wherein each zone includes a respective set of regions;

based on parameters of the gamma mixture hurdle model, estimating: (i) whether corresponding food sub-flows exist between pairs of the regions, and (ii) for pairs of the regions in which the corresponding food sub-flows are estimated to exist, potentials of the corresponding food sub-flows;

determining, using a linear programming framework, values for the corresponding food sub-flows, wherein the linear programming framework uses data specifying food flows as mass balance constraints on totals of the corresponding food sub-flows that are within each of the zones, the potentials as inequality constraints on the corresponding food sub-flows that are within each of the zones, and region-to-region distance data for the regions as a minimization constraint on the corresponding food sub-flows;

generating, based on the values for the corresponding food sub-flows, a map of simulated food flows between geographic regions;

providing, for display on a graphical user interface, the map of simulated food flows between the geographic regions, wherein the corresponding food sub-flows are illustrated as lines connecting the geographic regions on the map; and receiving a limitation, via the graphical user interface, of the values for the corresponding food sub-flows to determine vulnerabilities in a food system, wherein limiting the corresponding food sub-flows comprises a change in the lines connecting the geographic regions on the map.

15. The article of manufacture of claim 14, wherein the gamma mixture model is based on a linear combination of gamma function regressions representing the corresponding food flows.

16. The article of manufacture of claim 14, wherein estimating the potentials of the corresponding food sub-flows comprises:

determining a flow potential for a zone based on the potentials of the corresponding food sub-flows for regions within the zone;

determining that the flow potential for the zone is lower than a reported flow for the zone; and re-estimating the potentials of the corresponding food sub-flows for regions within the zone using the gamma mixture model and food importing information from international ports.

17. The article of manufacture of claim 16, wherein estimating the potentials of the corresponding food sub-flows further comprises:

after re-estimating the potentials of the corresponding food sub-flows for regions within the zone, determining that the flow potential for the zone is still lower than the reported flow for the zone; and scaling the flow potential for the zone to be commensurate with the reported flow for the zone.

18. A computing system comprising:
one or more processors;
memory; and
program instructions, stored in the memory, that upon execution by the one or more processors cause the computing system to perform operations comprising:

training a gamma mixture hurdle model characterizing a functional relationship between: output data specifying food flows between zones, and input variables representing food production and food consumption in the zones, wherein the training involves: (i) using binary logistic regression to estimate whether corresponding food flows exist between pairs of the zones, and (ii) for pairs of the zones in which the corresponding food flows are estimated to exist, using a gamma mixture model to estimate amounts of the corresponding food flows, and wherein each zone includes a respective set of regions;

based on parameters of the gamma mixture hurdle model, estimating: (i) whether corresponding food sub-flows exist between pairs of the regions, and (ii) for pairs of the regions in which the corresponding food sub-flows are estimated to exist, potentials of the corresponding food sub-flows;

determining, using a linear programming framework, values for the corresponding food sub-flows, wherein the linear programming framework uses data specifying food flows as mass balance constraints on totals of the corresponding food sub-flows that are within each of the zones, the potentials as inequality constraints on the corresponding food sub-flows that are within each of the zones, and region-to-region distance data for the regions as a minimization constraint on the corresponding food sub-flows;

generating, based on the values for the corresponding food sub-flows, a map of simulated food flows between geographic regions;

providing, for display on a graphical user interface, the map of simulated food flows between the geographic regions, wherein the corresponding food sub-flows are illustrated as lines connecting the geographic regions on the map; and receiving a limitation, via the graphical user interface, of the values for the corresponding food sub-flows to determine vulnerabilities in a food system, wherein limiting the corresponding food sub-flows comprises a change in the lines connecting the geographic regions on the map.

19. The computing system of claim 18, wherein using binary logistic regression to estimate whether corresponding food flows exist between pairs of the zones comprises:

sampling a probability that a food flow exists from a prior generalized exponential distribution;
selecting a random value between 0 and 1;
determining whether the probability is greater than the random value; and
determining food flows exist between pairs of the zones.

20. The computing system of claim 18, wherein estimating the potentials of the corresponding food sub-flows comprises:

determining a flow potential for a zone based on the potentials of the corresponding food sub-flows for regions within the zone;

determining that the flow potential for the zone is lower than a reported flow for the zone; and
re-estimating the potentials of the corresponding food sub-flows for regions within the zone using the gamma mixture model and food importing information from international ports.

\* \* \* \* \*